United States Patent [19]

Cirigliano et al.

[11] Patent Number: 6,120,823
[45] Date of Patent: *Sep. 19, 2000

[54] FLAVORING MATERIALS USED IN FOODSTUFFS

[75] Inventors: Michael Charles Cirigliano, Creeskill; Francis John Farrell, Madison; Raymond Thomas McKenna, Scotch Plains; Paul John Rothenberg, New Milford, all of N.J.

[73] Assignee: Lipton, divsion of Conopco, Inc., Englewood Cliffs, N.J.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/959,389

[22] Filed: Oct. 28, 1997

[51] Int. Cl.$^7$ .............................. A21D 4/00; A23L 1/22; A23L 2/00; A23L 1/222
[52] U.S. Cl. ...................... 426/321; 426/330.3; 426/538; 426/331; 426/335; 426/590; 426/654; 426/650; 426/601; 426/330
[58] Field of Search ................................ 426/330.3, 335, 426/330, 331, 597, 590, 654, 650, 538, 601, 321

[56] References Cited

U.S. PATENT DOCUMENTS

| | | | |
|---|---|---|---|
| 3,615,702 | 10/1971 | Swisher | 426/98 |
| 3,969,514 | 7/1976 | Tiemstra | 426/90 |
| 4,567,056 | 1/1986 | Schmidt | 426/607 |
| 4,748,033 | 5/1988 | Syfert et al. | 426/330.3 |
| 5,008,441 | 4/1991 | Nakanishi et al. | 560/75 |
| 5,336,513 | 8/1994 | Reimer | 426/548 |
| 5,431,940 | 7/1995 | Calderas | 426/330.3 |

FOREIGN PATENT DOCUMENTS

| | | |
|---|---|---|
| 0 144 417 | 8/1988 | European Pat. Off. . |
| 57/194775 | 11/1982 | Japan . |
| 97/21359 | 6/1997 | WIPO . |
| 97/30597 | 8/1997 | WIPO . |

OTHER PUBLICATIONS

International Search Report in the application of PCT/EP 98/0637.
Patent Abstracts of Japan JP 04 027374 published Jan. 30, 1992.
Horvat et al., "A gas–liquid chromatographic Method for Analysis ofPhenolic Acids in Plants", Journal of Agricultural Foods and Chemistry, vol. 28, pp. 1292–1295, 1980.
Patent Abstracts of Japan JP 61 195646 Published Jan. 17, 1987.
Database WIP abstract of CN 1 008 739 Published Jul. 6, 1994.
Patent Abstracts of Japan JP 07 194356 Published Aug. 1, 1995.
Taylor, R. J., *Foods Additives*, John Wiley & Sons, pp. 44–49, (1980).
*Food Chemical Codex*, National Academy Press, pp. 354–418, (1981).
Branen et al., *Food Additives*, Marcel Dekker, Inc., pp. 213–225, (1990).
Furia, Thomas E., *Handbook of Food Additives*, CRC Press, pp. 271–276, (1968).
Woodbine, M., *Antibiotics and Antibiosis in Agriculture*, Butterworths, pp. 103–130, (1977).
Derwent abstract of DE 44 34 314 Published Mar. 28, 1996.
Abstract of JP 08 066 171 Published Mar. 12, 1996.
Abstract of JP 59 015 477 Published Jan. 26, 1984.
Abstract of JP 56 021 557 Published Feb. 1981.
Derwent abstract of JP 49 015 788 Published Apr. 17, 1974.
Derwent abstract of CN 1081578 Published Feb. 9, 1994.

*Primary Examiner*—Anthony J. Weier
*Attorney, Agent, or Firm*—James J. Farrell

[57] ABSTRACT

A foodstuff having selected flavorant/antimicrobial compounds in an amount sufficient to result in a microbiologically stable foodstuff.

15 Claims, No Drawings

FLAVORING MATERIALS USED IN FOODSTUFFS

BACKGROUND OF THE INVENTION

Field of the Invention

The present invention relates to the use of natural and synthetically prepared flavorant materials which also act as antimicrobials in foodstuffs. These materials are selected substituted phenyl compounds.

BRIEF DESCRIPTION OF THE INVENTION

Many flavorants and many preservatives are readily available for many diverse uses. Certain foodstuffs however, because of their delicate and unique flavors require the utmost care in selecting both flavorants and preservatives. A balance must be achieved in stabilizing foods without deleteriously affecting their flavor.

A method for flavoring and preserving foodstuffs having a water activity exceeding 0.6 including beverages such as herbal teas, juices and the like both "still" and carbonated, for distribution and sale at ambient or chilled temperatures is disclosed. The method uses selected aromatic flavorant derivatives. Acidified and native pH foods in the 2.5–7.0 pH range which have unique flavoring profiles are also known to be susceptible to spoilage. As a result it is seen to be desirable to use a flavorant material which contributes to the flavoring profile and also functions as a preservative.

A method and composition for flavoring while simultaneously controlling microbial growth in carbonated beverages, dressings, sauces, marinades, margarines, spreads, condiments, meats and dairy based foodstuffs for distribution and sale at ambient or chilled temperatures is disclosed.

This method and composition, which also contributes to the stability of the foodstuff employs a class of chemical compounds characterized by a structure containing an aromatic base, preferably an aromatic acid such as phenylbutenoic or phenylhexenoic acid and selected derivatives.

Generally the aromatic based compounds are as follows:

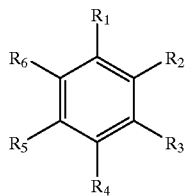

wherein $R_1$ is an unsaturated, non-halogenated side chain having up to about 9 carbons, one of which is preferably a carboxyl group, which may or may not be esterified, and the side chain has at least one double bond. The $R_1$ side chain preferably has up to about 6 carbon atoms. The $R_1$ side chain may contain unsaturated molecular components from the ester, alcohol, ketone or acid families. The compounds contain, as well, additional $R_{2-6}$ groups occupying the other sites on the benzene ring where $R_{2-6}$ may be the same or different and may be hydrogen or a low molecular weight non-halogenated neutral or electronegative group such as O, COOH, OH, $OCH_3$ $OC_2H_5$, $CH_3$ and $C_2H_5$ among others but at least one of $R_{2-6}$ must be a low molecular weight group. Examples of such compounds include the naturally occurring sinapic, caffeic, coumaric, chlorogenic and ferulic acids as well as eugenol, and anethole among others. These compounds, impart pleasant or unique desirable and distinctive flavor to tea beverages when properly combined. They also contribute to the stability of the beverage and may be used alone or in combination with mild heat treatments or reduced levels of traditional chemical preservatives such as sorbic and/or benzoic acid and their salts. They also contribute to antimicrobial activity at both ambient and chilled temperatures.

Acidified and native pH based salad dressings, sauces, marinades, meats and dairy based foods and beverages including juice flavored and juice containing beverages in the $2.5 \geq 7.0$ pH range are known to be susceptible to spoilage by yeast, mold, acid tolerant bacteria (e.g. Lactobacillus sp, Gluconobacter/Acetobacter sp.) and/or mesophilic or thermophilic spore forming (e.g. *B. coagulans* and the Alicyclobacillus sp.) and non-spore forming bacteria. The compounds of the invention such as 3,4-dihydroxycinnamic acids (i.e. caffeic acid), 4-hydroxy-3-methoxycinnamic acid (i.e. ferulic acid) and 3-caffeoylquinic acid (i.e. chlorogenic acid) alone, when formulated in combination with low levels of sorbic or benzoic acid and other flavor components contribute to a pleasant unique, desirable and distinctive flavored food product while adding the benefit of their antimicrobial activity. The compounds may be used at individual concentrations of preferably from about 25 to about 600 ppm and while used primarily as a flavorant have been found to be extremely effective antimicrobials. The compounds are effective against yeast, mold, and other acid tolerant and non-acid tolerant spore-forming and non-spore-forming spoilage bacteria in various foodstuffs including ready-to-drink still and carbonated beverages, dressings, sauces, marinades, margarines, spreads condiments, meats and dairy based foodstuffs.

Higher levels of the compounds of the invention up to about 2,000 ppm or higher may be used if desired.

The increased efficacy of these compounds as antimicrobials, relative to a simple phenolic acid like benzoic acid, is believed to be attributable to the presence of an unsaturated side chain. The efficacy of this side chain increases with the length of the side chain and the number of reactive double bonds contained in the same. The presence of these double bonds enhances the reactivity of the compound, internal to the microbial cell, after passive transport of the compound into the cell. This is similar to the transport of benzoic acid into the cell. The subsequent combination effects of the dissociation of the acid moiety internal to the cell, and the accompanying presence of one or more highly reactive double bonds, contributes significantly to the antimicrobial effect observed. Small chemical groups that release, or by virtue of their bonding structure, readily share electrons significantly stabilize the benzene ring's electrical charge and reduce the amount of energy needed to force reactions to take place at other sites on the ring. Relatively small electron withdrawing groups at other sites on the ring destabilize it and are therefore more easily released as highly reactive charged species or free radicals. The combination of these electron releasing and electron withdrawing species on the same ring provides unique reactive properties.

The small size of the attached groups facilitates passage through the cell membrane and concentrates the energy of reaction once inside the cell. These combinations include H, OH, $CH_3$, $NH_2$, $OCH_3$ as "activating" (electron releasing) groups, and COOH, $COCH_3$, CHO, $NO_2$ alone or attached to short unsaturated carbon chains, as electron withdrawing groups that become released as highly reactive charged or free radical species.

The use of the disclosed class of compounds, both naturally derived and synthetically prepared, provides a portfolio of antimicrobial compounds that may be used to formulate beverages which are "all-natural", by the current definition of the term. Pleasantly flavored foodstuffs that are stable and safe at ambient temperatures and/or that have an extended shelf life at chill temperatures are thus enabled. Further, the flexibility of the class of compounds affords a broad selection of agents suited to complement enhance and/or contribute of unique, desirable and distinctive flavor to the flavor profile of the food system.

Some specific examples of the compounds are as follows:

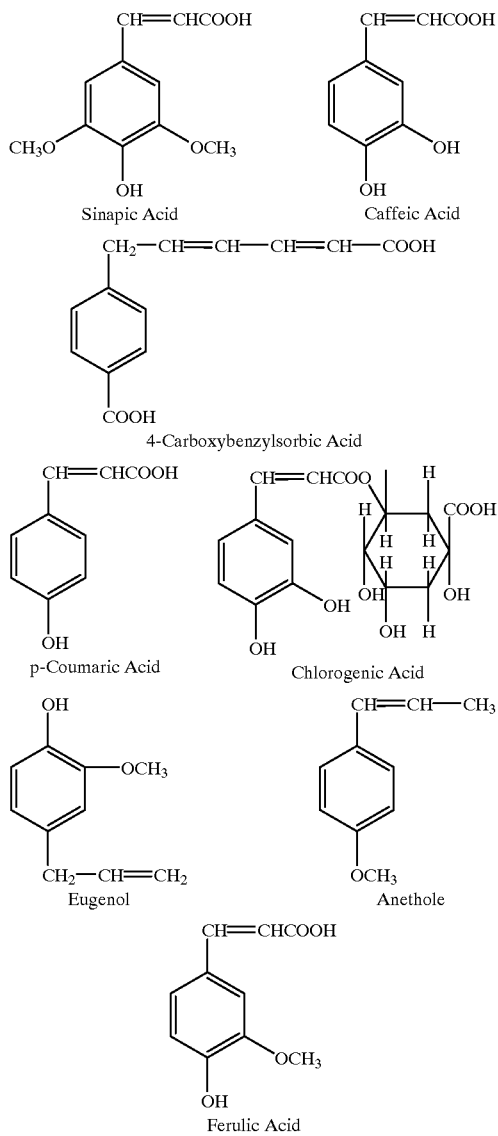

While not wishing to be bound thereby, it is theorized that the antimicrobial material operates as follows: Essentially the organism will typically passively transport the compound class described, in its non-dissociated (uncharged) state. Once the compound is in the cell it begins to dissociate, essentially upsetting the pH balance internal to the cell. An organism such as Z. bailii, one of the yeast species that poses a serious spoilage problem in foodstuffs is reported to possess an ability to pump a preservative such as benzoic acid out quite readily thus, leading to Z. bailii's reputation as being somewhat preservative resistant. The compounds of the present invention are less likely to succumb to the preservative pump because of added high reactivity of the unsaturated side chain. It is believed that for this reason compounds of the type disclosed are effective.

All parts and proportions herein and the appended claims are by weight unless otherwise indicated.

Several different foodstuffs are prepared for testing with the preservative of the invention as follows:

EXAMPLE 1
Salad Dressing

| Components | % |
|---|---|
| Part 1 | |
| Water | 70. |
| Vinegar | 7. |
| Sodium Chloride | 2. |
| Sweetener | 4. |
| EDTA | .007 |
| Gum | 0.4 |
| Flavors | 0.9 |
| Part 2 | |
| Vegetable Oil | 5.3 |
| Chlorogenic acid | 0.03 |
| Part 3 | |
| Water | 4.3 |
| Vinegar | 4.27 |
| Gum | .03 |
| Spices and Flavors | 1.80 |

Parts 1 and 2 are mixed and homogenized. Part 3 is then added and thoroughly mixed to form a homogenous mixture.

It is expected that a salad dressing utilizing the compound of the invention will have improved microbiological stability without sacrificing flavor.

EXAMPLE 2
Beverage

| | |
|---|---|
| Benzoic acid | .02% |
| Sorbic acid | .03% |
| Lemon Flavoring Powder | .08% |
| Lemon Juice | 2.% |
| Color Component | .06% |
| Citric Acid | .07% |
| EDTA | .003% |
| HFCS (High Fructose Corn Syrup) | 12.  % |
| Sinapic acid | .0125% |
| Water balance to | 100.% |

The beverage prepared as above is expected to have improved microbiological stability without sacrificing flavor.

EXAMPLE 3
Spreads

| Aqueous phase | | | |
|---|---|---|---|
| Water | 77.97 | 77.47 | 77.47 |
| Thickeners | 1.82 | 1.86 | 1.86 |
| Titanium Dioxide | 0.12 | 0.13 | 0.13 |
| EDTA | 0.01 | 0.01 | 0.01 |

-continued

| EXAMPLE 3 Spreads | | | |
|---|---|---|---|
| Salt | 1.96 | 2.00 | 2.00 |
| K-sorbate | 0.13 | 0.13 | 0.13 |
| Ferulic Acid | 0.05 | 0.05 | 0.05 |
| Colorants | 0.08 | 0.08 | .18 |
| Lactic Acid | 0.15 | 0.14 | 0.27 |
| Total | 88.00 | 88.00 | 88.00 |
| Oil Phase | Churn % | Churn % | Churn % |
| Lecithin | 0.10 | 0.10 | 0.10 |
| Emulsifier | 0.05 | 0.05 | 0.05 |
| Soy Bean Oil | 9.65 | 9.85 | 10.00 |
| Total Oil Phase | 10.00 | 10.00 | 10.00 |
| Flavorants Powder | | 2.00 | 1.00 |
| pH | 4.42 | 4.88 | 4.24 |

The spread is prepared in a known manner.

The combination of ferulic acid in these spreads is expected to give improved microbiological stability without sacrificing pleasant flavor.

Although the invention has been described with respect to preferred embodiments thereof, variations and modifications will be readily apparent to those skilled in the art without departing from the spirit and scope of the invention as set forth in the claims.

What is claimed is:

1. A non-halogenated flavorant compound having ancillary antimicrobial activity of the formula:

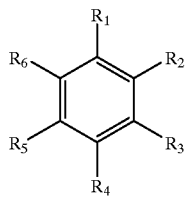

wherein said $R_1$ is a moiety having up to nine carbon atoms and at least 1 double bond;

wherein said R groups may be H or at least one of said R groups are non-halogen neutral or electronegative groups said compound being for use as an antimicrobial in a foodstuff having a water content to produce a water activity above 0.6 said compound being present in an antmicrobial effective amount and said compound being capable of having a selective flavoring effect on said foodstuff.

2. An aqueous based beverage comprising a sufficient amount to prevent microbial spoilage of a non-halogenated flavorant compound having ancillary antimicrobial activity, of the formula:

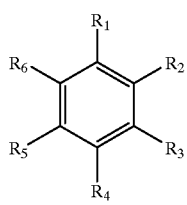

wherein said $R_1$ is a moiety having up to nine carbon atoms and at least 1 double bond;

wherein said R groups may be H or at least one of said R groups are nonhalogen neutral or electronegative groups, said beverage having a water activity above 0.6 and said compound being capable of having a selective flavoring effect on said beverage.

3. A salad dressing having an antimicrobially effective amount of a non-halogenated flavorant compound having ancillary antimicrobial activity of the formula:

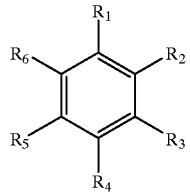

wherein said $R_1$ is a moiety having up to nine carbon atoms and at least 1 double bond;

wherein said R groups may be H or at least one of said R groups are non-halogen neutral or electronegative groups, said salad dressing having a water activity above 0.6 and said compound being capable of having a selective flavoring effect on said salad dressing.

4. A spread having in a sufficient antimicrobial amount to completely inhibit the outgrowth of yeast, mold, and spore forming and non-spore forming bacteria a non-halogenated flavorant compound having ancillary antimicrobial activity, of the formula:

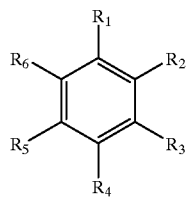

wherein said $R_1$ is a moiety having up to nine carbon atoms and at least 1 double bond;

wherein said R groups may be H or at least one of said R groups are nonhalogen neutral or electronegative groups, and said compound being capable of having a selective flavoring effect on said spread.

5. A foodstuff containing a sufficient amount to prevent microbial spoilage of a non-halogenated flavorant compound having ancillary antimicrobial activity, of the formula:

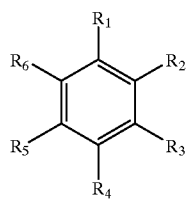

wherein said $R_1$ is a moiety having up to nine carbon atoms and at least 1 double bond;

wherein said R groups may be H or at least one of said R groups are nonhalogen neutral or electronegative groups, and said compound being capable of having a selective flavoring effect on said foodstuff, said foodstuff having a pH of about 2.0 to 7.0.

6. A foodstuff selected from the group consisting of dressings, sauces, marinades, dairy foods, spreads, margarine, meats and beverages having incorporated therein an antimicrobially effective amount of a non-halogenated flavorant compound having ancillary antimicrobial activity, of the formula:

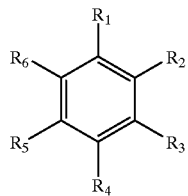

wherein said $R_1$ is a moiety having up to nine carbon atoms and at least 1 double bond;

wherein said R groups may be H or at least one of said R groups are nonhalogen neutral or electronegative groups, and said compound being capable of having a selective flavoring effect on said foodstuff.

7. A foodstuff as defined in claim 6 wherein the non-halogenated flavorant compound is present in an amount at least about 20 to 2000 ppm based on the water content of the foodstuff.

8. A foodstuff as defined in claim 6 having a sufficient amount of the non-halogenated flavorant compound, to completely inhibit outgrowth of yeast and/or mold and/or bacteria.

9. A foodstuff as defined in claim 6 containing a sufficient amount of the non-halogenated flavorant compound to destroy and/or inhibit the growth of pathogenic microbes.

10. A foodstuff as defined in claim 7 further comprising an antioxidant or oxygen scavenger.

11. A foodstuff as defined in claim 6 having solubilized metals wherein a sequestrant is present in an amount sufficient to reduce the deleterious effect of said solubilized metals on the stability of said foodstuff.

12. A foodstuff as defined in claim 6 wherein the water used to prepare the foodstuff is treated to reduce the water hardness to a level of 100 ppm or less measured as calcium carbonate.

13. A method of improving the ambient or chilled stability of foodstuffs by substantially preventing microbial growth in the foodstuff for a period of at least about 6 to 16 weeks which comprises blending about 20 to about 2000 ppm into the foodstuff of a non-halogenated flavorant compound having ancillary antimicrobial activity, of the formula:

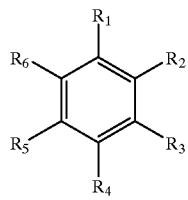

wherein said $R_1$ is a moiety having up to nine carbon atoms and at least 1 double bond;

wherein said R groups may be H or at least one of said R groups are nonhalogen neutral or electronegative groups, said compound being capable of having a selective flavoring effect, on said foodstuffs.

14. A foodstuff as defined in claim 6 comprising a dressing having from 0% to about 60% fat and having a pH of about 2.5 to 5.5.

15. A foodstuff as defined in claim 6 comprising a spread having from 0% to about 80% fat.

* * * * *